United States Patent Office 3,397,209
Patented Aug. 13, 1968

3,397,209
3-HYDROXY-5-ISOXAZOLE-CARBOXAMIDE
André R. Gagneux and Franz Hafliger, Basel, Switzerland, assignors to Geigy Chemical Corporation, Ardsley, N.Y., a corporation of New York
No Drawing. Filed Nov. 25, 1966, Ser. No. 596,774
2 Claims. (Cl. 260—307)

The present invention concerns a novel compound which is useful as intermediate in processes for the production of isoxazole derivatives of valuable pharmacological properties.

It has been found that 3-hydroxy-5-aminoethylisoxazole (5-aminoethyl-3-isoxazolol) of Formula I

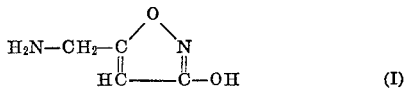

as well as its acid addition salts can be produced by reducing the novel intermediate, 3-hydroxy-5-isoxazole carboxamide of Formula II

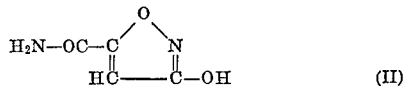

by means of diborane in an organic solvent. The reduction is performed, e.g. by means of diborane, which can be used as such or can be formed in situ from an alkali metal borohydride and aluminum chloride, at room temperature or moderately raised temperature. A solvent containing ether oxygen, for example, can be used as reaction medium, such as tetrahydrofuran, dioxan, diethyl or dibutyl ether or pyridine.

Even in very slight dosages, 5-aminomethyl-3-isoxazole and its salts with pharmaceutically acceptable acids have an inhibiting action on the central nervous system. In particular they strongly potentiate the action of anesthetics and reduce motility; they have catatonic and sedative action; they inhibit the tremorin tremor and have an antiemetic action (viz. U.S. Patent No. 3,242,190).

The novel 3-hydroxy-5-isoxazole carboxamide is produced by starting from the known 3-bromo- or 3-chloro-5-isoxazole carboxylic acid. These acids can be produced, e.g. by oxidation of the corresponding 3-halogen-5-isoxazole carboxylic acid described by J. Thiele and H. Landers, Ann. 369, 300 etc. (1909) or by the processes described by R. Fusco and S. Rossi, Rend. Ist. Lombardo Sci. pt. I. Classe Sci. Mat. e Nat. 94 A, 729–740 (1960), (CA 57, 16583 d,e) or P. Bravo, G. Gaudiano, A. Quilico and A. Ricca, Gazz. Chim. Ital. 91, 47–64, particularly 60–63 (1961), CA 58, 12869 e etc.).

The 3-halogen-5-isoxazole carboxylic acids are converted into 3-lower alkoxy-5-isoxazole carboxylic acids or into 3-benzyloxy-5-carboxylic acid by reaction with a lower alkanol, particularly methanol, or with benzyl alcohol, and an alkali metal hydroxide, particularly potassium hydroxide, while heating. The 3-hydroxy-5-isoxazole carboxylic acid is liberated from these acids by heating with hydrobromic acid, hydrochloric acid or, optionally substituted pyridinium bromide or chloride. 3-hydroxy-5-isoxazole carboxylic acid can be converted into the novel 3 - hydroxy - 5 - isoxazole carboxamide, for example, by conversion into its acid chloride, e.g. reacting with thionyl chloride in an inert organic solvent such as toluene, while heating, and reacting the acid chloride with ammonia, e.g. in a concentrated aqueous solution.

The following non-limitative example further illustrates the invention. The temperatures are given therein in degrees centigrade.

EXAMPLE (a) 626 g. (4.5 mol) of 2-(2-nitrovinyl)-furane (produced according to J. Thiele and H. Landers, Ann. 369, 300 (1909) in 6.26 litres of glacial acetic acid and 3.13 litres of 48% hydrobromic acid are heated for 9 hours on a steam bath.

After concentrating to 3 litres in vacuo, it is diluted with 3 litres of water, boiled, and Hyflo and charcoal are added whereupon it is finally filtered. The crystals obtained on cooling are removed by filtration. The filtrate is extracted four times with 500 ml. of chloroform each time and the extracts so obtained are combined with the above crystals. The chloroform solution is dried over sodium sulphate and concentrated. After recrystallizing the residue from benzene and cyclohexane, the 3-bromo-5-isoxazole propionic acid melts at 102–106°.

(b) 44 g. (0.2 mol) of 3-bromo-5-isoxazole propionic acid are dissolved in 440 ml. of concentrated sulphuric acid and a solution of 80 g. (0.8 mol) of chromium trioxide in 80 ml. of water is added dropwise to the about 15–20° warm solution within about 3 hours while stirring.

The reaction mixture is poured onto 800 g. of ice and it is extracted three times with 500 ml. of ether each time. The combined ethereal extracts are dried over magnesium sulphate and concentrated and the residue is recrystallized from 500 ml. of benzene/toluene (1:1), whereupon 3-bromo-5-isoxazole carboxylic acid is obtained, M.P. 170–175°. A mixture of the end product and starting material (3:2) is obtained from the mother liquor, which mixture can be used in another oxidation.

(c) 30.7 g. (0.16 mol) of 3-bromo-5-isoxazole carboxylic acid and 27 g. (0.48 mol) of potassium hydroxide are stirred into 540 ml. of benzyl alcohol for 2 hours at 140°. After cooling, 1.5 litres of water are added to the reaction mixture which is then extracted with three portions of ether each of 1.5 litres. The aqueous phase is boiled for a short time, filtered and finally concentrated hydrochloric acid is added. The crystals which precipitate are filtered off under suction, washed with water, dried and then recrystallized from benzene. The 3-benzyloxy-5-isoxazole carboxylic acid so obtained melts at 119–122°

(d) 2.19 g. (10 millimol) of 3-benzyloxy-5-isoxazole carboxylic acid (M.P. 118–122°) are refluxed for 1 hour in 50 ml. of 48% aqueous hydrobromic acid. After cooling, 100 ml. of water are added to the reaction mixture which is then extracted once with 100 ml. of cold pentane and finally concentrated to a volume of about 30 ml., whereupon crystallization occurs. The crystals are filtered off, washed with 30 ml. of cold water and dried over phosphorus pentoxide. The 3-hydroxy-5-isoxazole carboxylic acid so obtained melts at 245–250° with decomposition (NMR spectrum: $D_2O=3.82$).

(e) 640 mg. (5 millimol) of 3-hydroxy-5-isoxazole carboxylic acid are finely pulverized, suspended in 10 ml. of toluene and 5 ml. of thionyl chloride are added dropwise at the boiling temperature of the solvent. The reaction mixture is refluxed for 18 hours and then concentrated in vacuo.

5 ml. of concentrated ammonia solution are added to the 3-hydroxy-5-isoxazole carboxylic acid chloride which remains, the addition being made while cooling with ice and stirring. After evaporating the mixture and drying the residue over phosphorus pentoxide, a mixture of 3-hydroxy-5-isoxazole carboxamide ($D_2O=3.63$) and ammonium chloride is obtained, which mixture can be further worked up directly.

(f) 10 ml. of a 0.7 molar solution of diborane in abs. tetrahydrofuran are added dropwise to a suspension of 700 mg. (about 5 millimol) of 3-hydroxy-5-isoxazole carboxamide (contaminated with a little ammonium chloride) in 20 ml. of abs. tetrahydrofuran, the addition being made at 20° while stirring vigorously. On completion of the dropwise addition, the whole is stirred for another 10 minutes, then 5 ml. of water in 10 ml. of tetrahydrofuran are carefully added and finally the whole is evaporated to dryness in vacuum at 30°. A few drops of methanolic hydrochloric acid and 20 ml. of methanol/tetrahydrofuran (1:1) are added to the residue so obtained which is then filtered to remove insoluble parts. On carefully adding triethylamine to the filtrate, the 3-hydroxy-5-aminomethyl-isoxazole precipitates out in the form of the hybrid ion. It is filtered off and, after crystallization from a mixture of water, methanol and tetrahydrofuran, pure 3-hydroxy-5-aminomethyl-isoxazole is obtained, M.P. 175° (with decomposition).

(g) Isolation of 3-hydroxy-5-isoxazole carboxamide from the mixture with ammonium chloride is carried out by extraction of the mixture with diethyl ether, separation of the undissolved ammonium chloride by filtration, and evaporation of the ether, leaving pure 3-hydroxy-5-isoxazole carboxamide as the residue.

We claim:
1. 3-hydroxy-5-isoxazole carboxamide.
2. 3-hydroxy-5-isoxazole carboxylic acid.

References Cited

Gagneux et al., Tetrahedron Letters, No. 25, pp. 2081–2084 (1965).

ALTON D. ROLLINS, *Primary Examiner.*